(12) United States Patent
Family (10) Patent No.: US 12,371,151 B2
(45) Date of Patent: Jul. 29, 2025

(54) FLIGHT CONTROL SURFACE (71) Applicant: AIRBUS OPERATIONS LIMITED, Bristol (GB)

(72) Inventor: Oliver Family, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 18/471,519

(22) Filed: Sep. 21, 2023

(65) Prior Publication Data

US 2024/0101247 A1 Mar. 28, 2024

(30) Foreign Application Priority Data

Sep. 23, 2022 (GB) ..................... 2213901

(51) Int. Cl.
*B64C 9/24* (2006.01)
*B64C 23/06* (2006.01)
(52) U.S. Cl.
CPC .............. *B64C 9/24* (2013.01); *B64C 23/076* (2017.05)
(58) Field of Classification Search
CPC ..... B64C 2009/005; B64C 9/32; B64C 9/323; B64C 9/34; B64C 23/076; B64C 9/22; B64C 9/24; B64C 9/26
See application file for complete search history.

(56) References Cited

U.S. PATENT DOCUMENTS

| | | | |
|---|---|---|---|
| 2,987,277 A | 6/1961 | Richardson et al. | |
| 3,022,965 A | 2/1962 | Caciagli | |
| 2004/0079835 A1 * | 4/2004 | Volk | B64C 9/22 244/76 C |
| 2016/0031546 A1 | 2/2016 | Rolston | |
| 2017/0259908 A1 | 9/2017 | Omeara et al. | |

FOREIGN PATENT DOCUMENTS

| | | | |
|---|---|---|---|
| EP | 3656662 A1 | 5/2020 | |
| FR | 2902756 A1 * | 12/2007 | ............... B64C 9/06 |
| GB | 442122 | 4/1934 | |

(Continued)

OTHER PUBLICATIONS

Extended European Search Report cited in EP 23196689.6 mailed Feb. 7, 2024, 6 pages.

(Continued)

*Primary Examiner* — Timothy D Collins
*Assistant Examiner* — Eric Acosta
(74) *Attorney, Agent, or Firm* — Nixon & Vanderhye P.C.

(57) ABSTRACT

An aircraft wing with a moveable leading edge device mounted towards the leading edge of the wing. The leading edge device is moveable between a first configuration, a second configuration and a third configuration. In the first configuration, the leading edge device is retracted fully within the wing profile. In the second configuration, a portion of a surface of the leading edge device is extended away from the wing profile and into the oncoming airflow on the lower surface of the wing as the wing moves through the airflow to increase lift produced by the wing. In the third configuration, a portion of the surface of the leading edge device is extended away from the wing profile into the oncoming airflow over the upper surface of the wing to impair lift produced by the wing.

18 Claims, 8 Drawing Sheets

(56) References Cited

FOREIGN PATENT DOCUMENTS

| | | | |
|---|---|---|---|
| GB | 442122 A | * | 2/1936 |
| GB | 581876 A | | 10/1946 |
| GB | 2450793 A | | 1/2009 |
| GB | 2554882 A | | 4/2018 |
| GB | 2572216 A | | 9/2019 |

OTHER PUBLICATIONS

Combined Search Report and Examination Report for GB2213901.8 dated Mar. 3, 2023, 8 pages.

* cited by examiner

FLIGHT CONTROL SURFACE

RELATED APPLICATION

This application incorporates by reference and claims priority to United Kingdom patent application GB 2213901.8, filed Sep. 23, 2022.

TECHNICAL FIELD

The present invention relates to an aircraft wing with a moveable leading edge device and a method of moving a moveable leading edge device on a wing.

BACKGROUND

An aircraft wing will have a combination of flight control surfaces arranged on the leading edge (e.g. slats), trailing edge (flaps) or surfaces of the wings. These flight control surfaces primarily act by being actuated to protrude from the wing and alter the airflow around the wings.

The flight control surfaces act as lift generating devices, lift dumping devices, or are used to control the movement of the aircraft during flight e.g. roll, yaw, pitch control. Each device is typically actuated by actuation systems that are connected to a central control system.

The flight control surfaces are typically positioned at specific locations along the wing because the actuation systems may be complex and occupy large volumes of space within the wing. This makes it challenging to fit flight control surfaces in some wings, which have smaller volumes, without losing the functionality of the flight control surfaces and the aircraft.

SUMMARY OF THE INVENTION

According to an aspect of the present invention, there is provided an aircraft wing comprising a leading edge, a trailing edge, an upper surface extending between the leading edge and the trailing edge and a lower surface extending between the leading edge and the trailing edge to define a wing profile, and a moveable leading edge device mounted towards the leading edge, wherein the leading edge device is movable between: a first configuration in which the leading edge device is retracted fully within the wing profile; a second configuration in which at least a portion of a surface of the leading edge device is extended away from the wing profile and into the oncoming airflow on the lower surface of the wing when the wing is moved through the airflow; and a third configuration in which at least a portion of the surface of the leading edge device is extended away from the wing profile and into the oncoming airflow over the upper surface of the wing when the wing is moved through the airflow.

The moveable leading edge device is mounted closer to the leading edge of the wing than to the trailing edge. The leading edge device may be immediately adjacent to the leading edge of the wing.

When the moveable leading edge device is retracted fully within the wing, the leading edge device does not interfere with oncoming airflow that flows around the wing profile.

When the moveable leading edge device is extended away from the wing profile, the leading edge device surface disrupts the oncoming airflow that flows around the wing profile. Extended away means that at least a portion of the leading edge device is distanced away from the wing profile.

The moveable leading edge device may extend through an aperture in the lower surface of the wing in the second configuration.

The moveable leading edge device may extend through an aperture in the upper surface of the wing in the third configuration.

The leading edge device may be driven to move between the first, second and third configurations mounted on a track or from a linkage arrangement.

The track or linkage arrangement are positioned within the wing profile and are used to control the movement of the leading edge device.

In the second configuration the leading edge device may increase lift produced by the wing.

The airflow adjacent to the lower surface of the wing travels at a slower speed and is at a higher pressure. The moveable leading edge device disrupts this airflow adjacent to the lower surface of the wing which reduces the air pressure. This reduces the lift produced by the wing.

In the third configuration the leading edge device may impair the lift produced by the wing.

The airflow adjacent to the upper surface of the wing travels faster and has a lower air pressure. The moveable leading edge device disrupts the airflow adjacent to the upper surface of the wing, which reduces air pressure. This increases the lift produced by the wing.

The wing may have a chord and the leading edge device surface may be oriented approximately perpendicular to the chord when in the second and third configurations.

Orienting the leading edge device surface approximately perpendicular to the chord increases the surface area of the leading edge device that disrupts the oncoming airflow. The moveable leading edge device acts to increase wing camber and lift coefficient.

The leading edge device surface may be oriented approximately perpendicular to the chord when in the first configuration.

The aircraft wing may further comprise an actuator coupled to the leading edge device for moving the leading edge device between the first, second and third configurations.

The actuator may be any suitable mechanical, hydraulic or electrical system to move the leading edge device.

The leading-edge device may comprise a panel.

The panel is a generally rectangular component. The panel has a length in the chordwise direction, a width in the spanwise direction and a thickness. The width of the panel is longer than the length of the panel. The panel may be flat or curved.

The aircraft wing may further comprise a front spar and wherein the leading-edge device is located between the leading edge and the front spar.

The wing may have a root end and a tip end, and the leading edge device may be located adjacent the tip end.

The tip end of the wing is thinner than the root of the wing. The tip end of the wing therefore has less volume and space to accommodate conventional complex actuation mechanisms for flight control surfaces or multiple flight control surfaces.

The wing may have a wing tip device and the leading-edge device may be located on the wing tip device.

The wing may have a span between a root end and a tip end thereof and defining a spanwise direction, and the wing may have no other movable flight control surfaces overlapping in the spanwise direction at the location of the leading edge device.

No other moveable flight control surfaces may be necessary because the leading edge device can perform both lift impairing and lift generating functions.

A further aspect of the invention may include a method of operating an aircraft wing, the wing comprising a leading edge, a trailing edge, an upper surface extending between the leading edge and the trailing edge and a lower surface extending between the leading edge and the trailing edge to define a wing profile, and a moveable leading edge device mounted towards the leading edge, the method comprising moving the leading edge device between: a first configuration in which the leading edge device is retracted fully within the wing profile; a second configuration in which at least a portion of a surface of the leading edge device is extended away from the wing profile and into the oncoming airflow on the lower surface of the wing impairing lift produced by the wing; and a third configuration in which at least a portion of the surface of the leading edge device is extended away from the wing profile and into the oncoming airflow over the upper surface of the wing increasing lift produced by the wing.

The second configuration may be adopted at high speed flight for load alleviation or roll control.

The third configuration may be adopted at low speed flight for improving a stall angle of attack of the wing.

The stall angle of attack is the angle of attack which the wing makes with the free stream flow where lift produced by the wing begins to decrease significantly. In the second configuration, the leading edge device increases the wing camber and the lift coefficient of the wing which increases the stall angle of attack.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
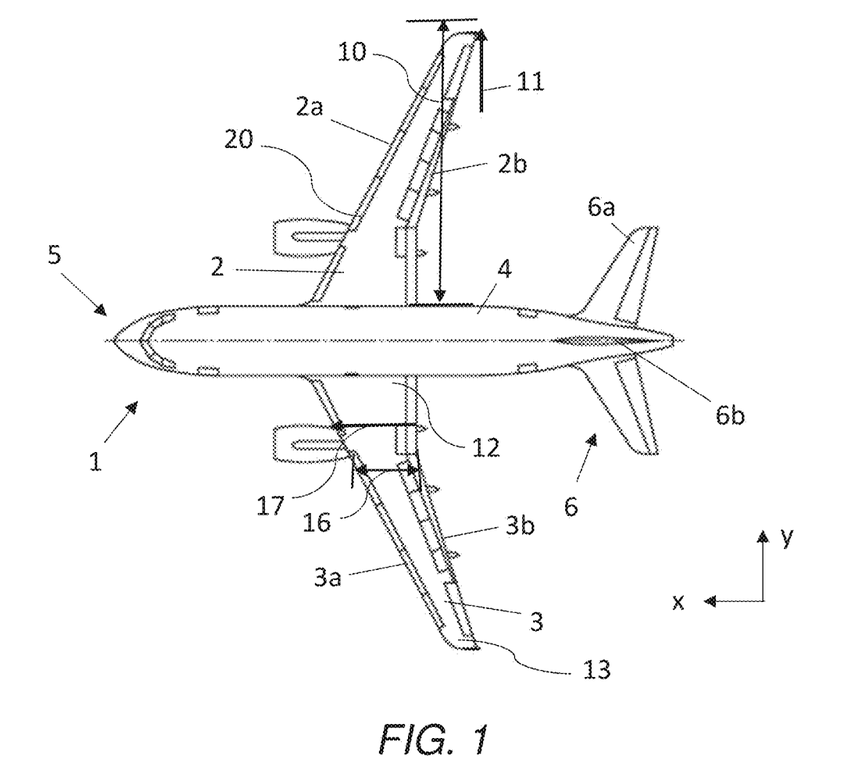
FIG. 1 shows a plan view of an aircraft.

FIG. 1 shows an aircraft 1 with port and starboard fixed wings, 2, 3, a fuselage 4 and a nose end 5 and a tail end 6 including horizontal and vertical stabilising surfaces 6a, 6b. Each wing has a leading edge 2a, 3a and trailing edge, 2b, 3b. The aircraft 1 is a typical jet passenger transonic transport aircraft but the invention is applicable to a wide variety of wing aircraft types, including commercial, military, passenger, cargo, jet, propeller, general aviation etc.

Figure 2:
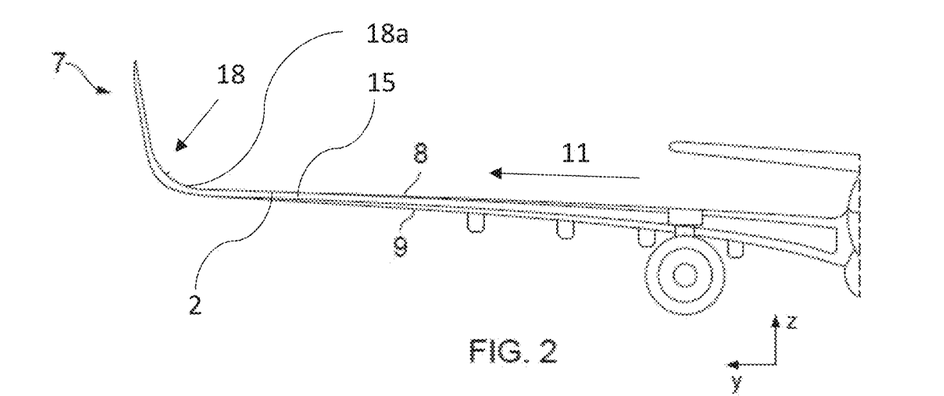
FIG. 2 shows a front view of an aircraft wing.

The axes shown in FIGS. 1 and 2 represent the usual reference orthogonal axes of the aircraft 1. The X-axis defines the longitudinal fore-aft direction of the aircraft; the Y-axis defines the spanwise direction and the Z-axis defines the vertical up-down direction of the aircraft.

Each wing 2,3 of the aircraft has a cantilevered structure with a length (i.e. span 10) extending in a spanwise 11 direction from a root 12 to a tip 13. The root 12 is joined to the aircraft fuselage 4. The wing portion near the root 12 is the inboard region. The wing portion near the tip 13 is called the outboard region. The wings 2,3 have a leading edge 2a, 3a and a trailing edge 2b, 3b respectively. The wings 2,3 also has a chord 16 extending in a chordwise direction 17 from a leading edge 2a,3a to a trailing edge 2b,3b.

FIG. 2 shows the front view of the wing 2 in greater detail. As shown, the wing 2 has an outer aerodynamic surface formed from an upper surface 8 and a lower surface 9. The upper surface 8 extends between the leading edge 2a and the trailing edge 2b on the upper side of the wing 2. Similarly, the lower surface 9 extends between the leading edge 2a and the trailing edge 2b on the lower side of the wing 2. The upper surface and lower surface define a wing profile 15. At the tip end of each wing 2,3 is a wing tip device 7 outboard of the main portion of the wing. The wing tip devices 7 are used to reduce the induced drag of the aircraft.

Different aircraft have varying wing tip device 7 designs. Between the main portion of the wing and the wing tip device 7, there exists a transition region 18. This transition region ensures that the aerodynamic profile between the wing 2 and the wing tip device 7 is maintained by smooth surface blending. The upper surface 8 of the transition region 18a is a smoothly upwardly curved surface. Alternatively, the wings 2,3 may have a different wing tip device 7 configuration.

The wings 2,3 are aft swept and have a number of aerodynamic flight control surfaces 20. There are a number of flight control surfaces, such as ailerons, elevator, rudders, spoilers, flaps, slats or air brakes. These are typically located on the wing 2,3 or on the horizontal stabiliser 6a or vertical stabiliser 6b of the aircraft 1.

Flight control surfaces 20 are adjustable during flight to adjust the aircraft flight altitude or wing performance by controlling the airflow over the wings 2,3. For example, ailerons may be used to tilt the wings 2,3 to control the roll of the aircraft, while leading edge devices (such as slats, flaps) may be used to increase the lift coefficient of the wings 2,3 at lower speed (such as take-off) or reduce the landing speed. The main leading-edge devices 20 are typically found on or towards the leading edge 2a, 3a of the aircraft wings.

Figure 3A:
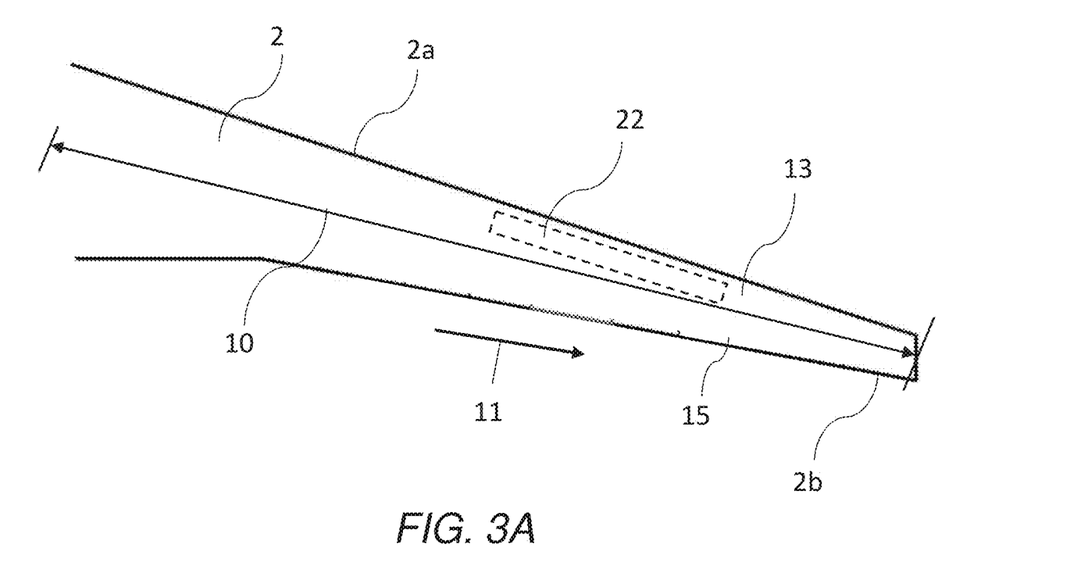
FIG. 3A shows a top of view of an aircraft wing.
Figure 3B:
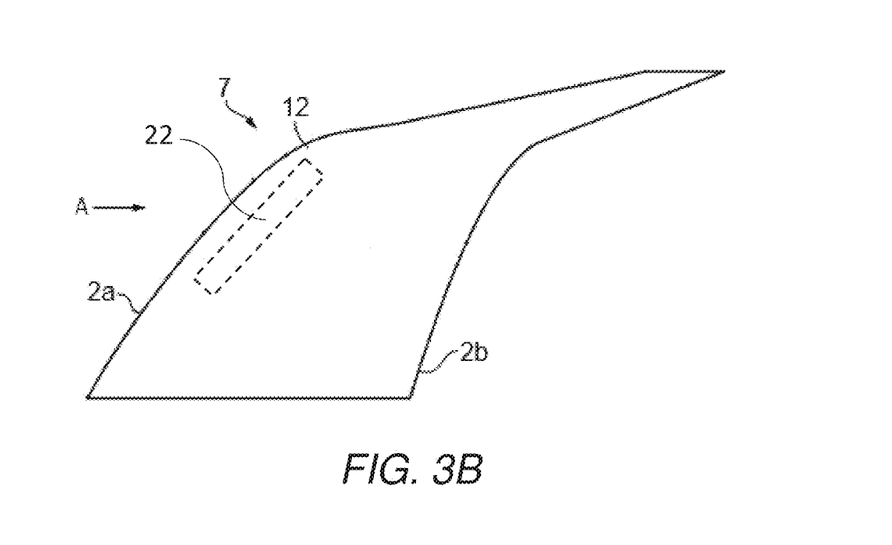
FIG. 3B shows a wing tip device.

A plan view of an exemplary wing 2 with an exemplary leading edge device 22 is shown in FIG. 3A. The leading edge device 22 is preferably located next to the tip end 13 of the wings 2,3 (shown schematically by the dotted lines in FIG. 3A). The tip end 13 of the wings 2,3 is where the flexion and subsequent stress experienced by the wings 2,3 is greater than inboard region 12. However, the leading edge device 22 may be positioned at any position along the length (span 10) of the wing 2. Alternatively, the leading edge device 22 may be located on the wing tip device 7, as shown schematically by the dotted lines in FIG. 3B. As shown, the wing 2 has no other moveable flight control surfaces 20 overlapping the spanwise direction 11 at the location of the moveable leading edge device 22.

Figure 4A:
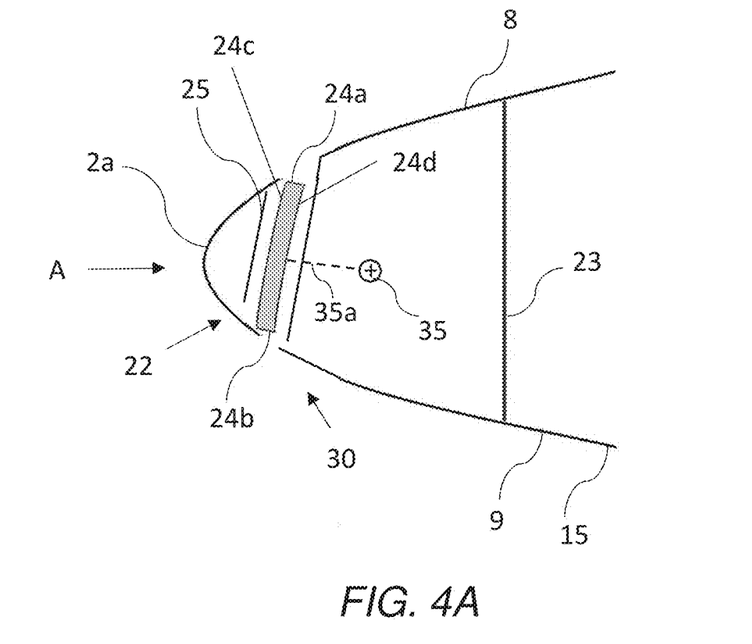
FIG. 4A shows a cross-section of a wing with an exemplary leading edge device in a first configuration.

FIG. 4A shows a cross-sectional view of the wing 2 with the leading edge device 22 shown in FIG. 3A. The leading edge device 22 is mounted towards the leading edge 2a. The leading edge device 22 is therefore located nearer to the leading edge 2a than the trailing edge 2b (not shown in FIG. 4A) of the wing 2. As shown, the leading edge device 22 is located between the front spar 23 and the leading edge 2a of the wing 2.

The leading-edge device 22 comprises a panel 24. In this example, the panel 24 is generally rectangular in planform (shown more clearly in FIG. 5). The panel 24 has a length L in the chordwise direction 17, a width W in the spanwise direction 11, and a thickness T. The length L of the panel 24 is between the leading edge (i.e. the proximal edge 24a) and the trailing edge (i.e. the distal edge 24b). In this example, the length L of the panel is larger than the width W and the height H of the panel. The panel 24 is shown in FIG. 4 to have a curved profile in the height dimension (to achieve a concave or convex flow surface), but a linear length dimension L.

The panel 24 has a proximal end 24a and a distal end 22b. The proximal end 22a is closer to the upper surface 8 of the wing 2, while the distal end 22b is closer to the lower surface 9 of the wing 2 in the first configuration 30. The panel 24 has an outward (forward, aerodynamic) surface 24c and an inner (reverse) surface 12d.

The leading edge device 22 is shown in the first configuration 30 in FIG. 4A. In the first configuration 30, the leading edge device 22 is fully retracted within the wing profile 15 and is seated in a slot 25. The slot 25 extends to an aperture 28 in the upper surface 8 of the wing 2. The slot 25 also extends to an aperture 29 in the lower surface 9 of the wing 2. In the first configuration 30, the panel 24 does not extend past the apertures 28, 29, or past the upper surface 8 or the lower surface 9. The panel 24 therefore does not affect the oncoming airflow A.

Figure 4B:
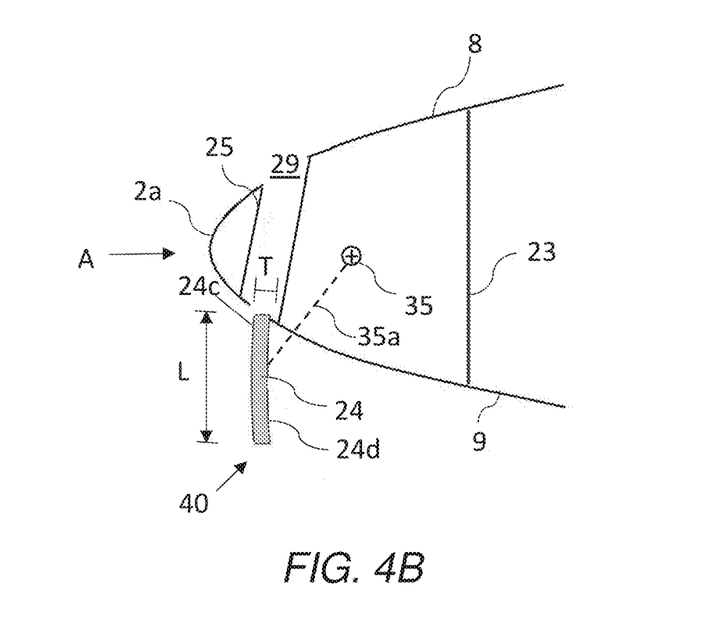
FIG. 4B shows a cross-section of a wing with an exemplary leading edge device in a second configuration.
Figure 4C:
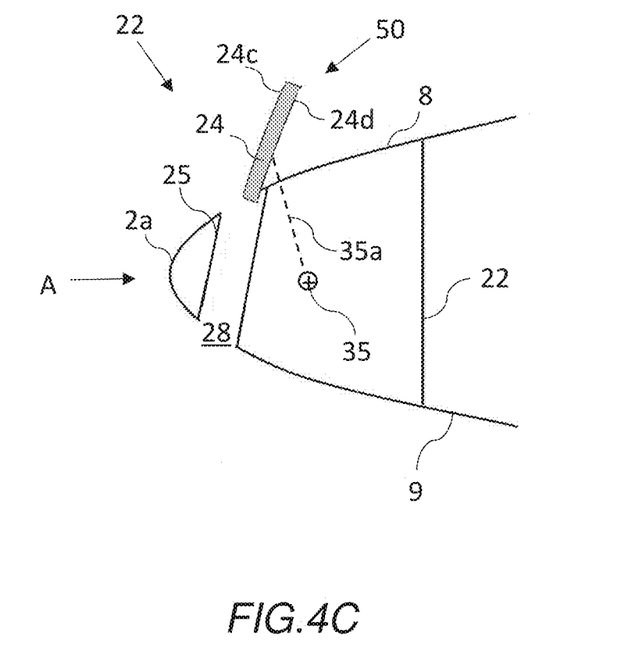
FIG. 4C shows a cross-section of a wing with an exemplary leading edge device in a third configuration.

The apertures 28,29 are shown schematically in FIGS. 4A-4C. It will be understood that the panel 24 may be dimensioned so that the proximal end 24a of the panel 24 is in line with the upper surface 8 of the wing and the distal end 24b of the panel 24 is in line with the lower surface 9 in the first configuration 30. In this example, the proximal and distal ends 24a, 24b have a shape that conforms to the local surrounding aerodynamic surface of the wing 2. The proximal and distal ends 24a, 24b therefore contribute to the aerodynamic wing profile 15.

In another example (not shown), the panel 24 may be positioned in the slot 25 so that the proximal end 24a and the distal end 24b of the panel 24 does not extend past the apertures 28,29 in the first configuration. The apertures 28,29 may be covered by a retractable panel (not shown) or a seal (not shown) to conform to the local surrounding aerodynamic surface of the wing 2. The apertures 28,29 may therefore be covered by any suitable component to help contribute to the aerodynamic wing profile 15.

The leading edge device 22 is configured to move from a first configuration 30 to a second configuration 40 in FIG. 4B. The leading edge device 22 is also configured to be positioned into a third configuration 50, described in further detail in reference to FIG. 4C. The leading edge device 22 is configured to be moved between configurations via the actuator 35 (shown schematically in FIGS. 4A-4C, but in more detail in FIG. 6). The inner surface 12d may be attached to an actuation mechanism 30 (shown schematically in FIG. 4) by any mechanical means, such as bolting.

FIG. 4B shows the second configuration 40 of the leading edge device 22. In the second configuration 40, the leading-edge device 22 extends through the aperture 29 in the lower surface 9 of the wing 2. The panel 24 displaces downward away from the wing 2, so that the outer surface 24c of the panel 24 extends away from the wing profile 15 in the second configuration 40 into the oncoming airflow A. This increases the lift produced by the wing 2.

The second configuration 40 may also be used to control the movement of the wings 2,3. For example, the second configuration 40 may be adopted at high speed flight for load alleviation or roll control of the aircraft 1.

As shown in FIG. 4B, the slot 25 is dimensioned to house the panel 24 in the first configuration 30 but also as the panel moves to the second configuration 40 and the third configuration 50 (discussed further below).

The leading edge device 22 may also be configured to move into a third configuration 50, as shown in FIG. 5C. In the third configuration 50, the leading edge device 22 extends through the aperture 28 in the upper surface 8 of the wing 2. As shown, the outer surface 24c of the panel 24 extends away from the wing profile in the third configuration 50 into the oncoming airflow A. The oncoming airflow A is subsequently deflected by the outer surface 24c and alters the flow of air around the upper surface 8 of the wing 2. The third configuration 50 is adopted for low speed flight for improving a stall angle of attack on the wing.

Figure 5:
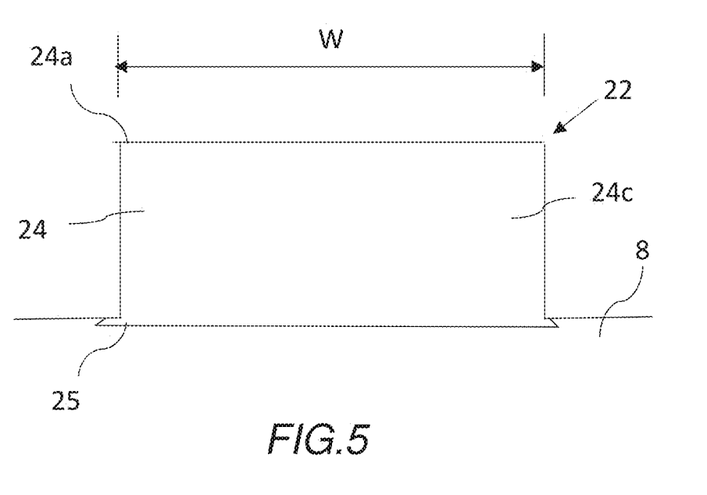
FIG. 5 shows a front view of an exemplary leading edge device in a second configuration.

FIG. 5 shows a front view of the wing 2 with the leading edge device 22 in a third configuration 50. As shown, the outer surface 24c of the panel 24 is oriented approximately perpendicular to the chord 16 in the first configuration 30, wherein approximately is within ten degrees of perpendicular to chord 16.

As shown, the outer surface 24c of the panel 24 extends away from the wing profile 15 into the oncoming airflow A. The oncoming airflow A is subsequently deflected by the outer surface 24c.

This alters the flow of air around the upper surface of the wing 2. In this configuration, the wing leading edge device 22 impairs the lift produced by the wing. The third configuration 50 may also be used to control the movement of the wing 2. For example, the third configuration 50 may be adopted at low-speed flight to improve the stall angle of attack of the wing 2. This helps prevent stalling of the aircraft 1 during specific manoeuvres, such as take-off.

Figure 6A:
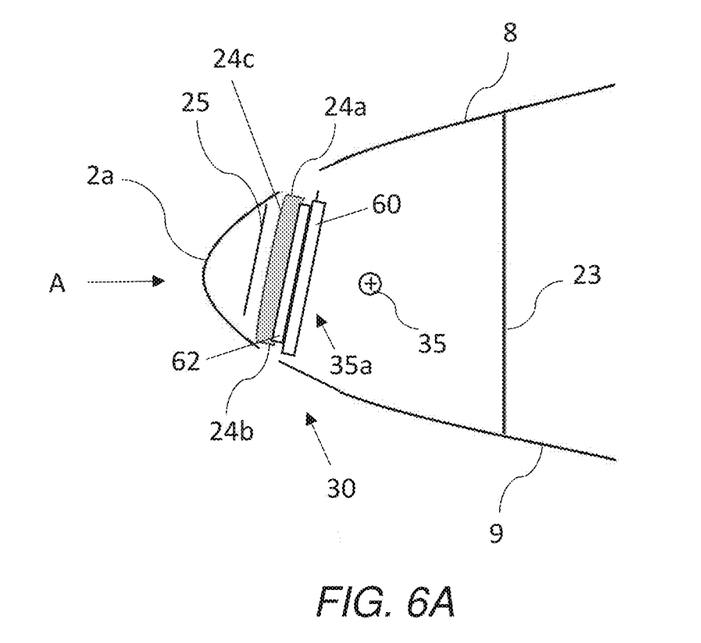
FIGS. 6A-6D shows another exemplary actuation mechanism used to move the exemplary leading edge device from a first configuration to a second and third configurations.
Figure 6B:
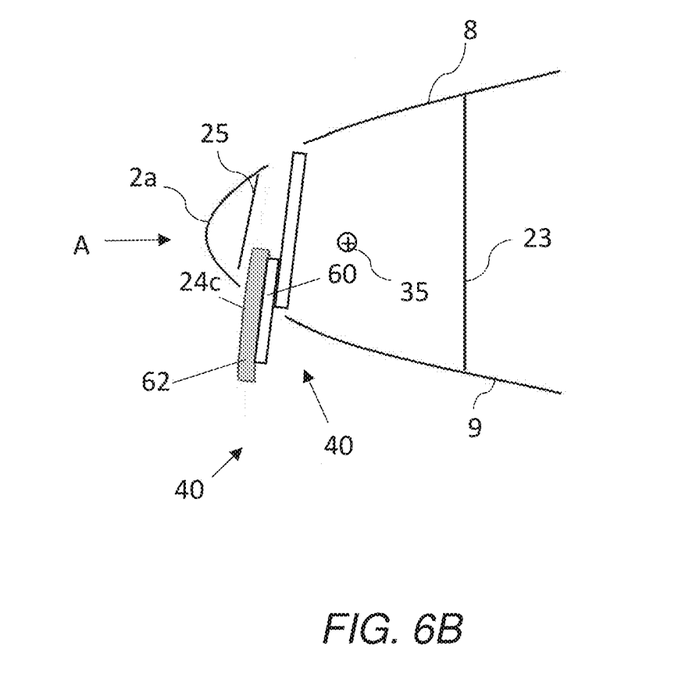

The leading edge device 22 may be moved between the first configuration 30 and the second configuration 40 by any suitable actuation system 35, shown schematically in FIGS. 4A-4C and in more detail in FIGS. 6A and 6B. The actuation mechanism 35 is shown to be schematically connected to the panel 24 via a mechanism 35a. The mechanism 35a may be any suitable mechanical mechanism used to displace the panel 24.

FIG. 6A-6D shows two exemplary actuation systems 35 and mechanisms 35a which are used to displace the leading edge device 22 from a first configuration 30, to a second configuration 40 and a third configuration 50.

FIG. 6A shows a cross-section view of the wing 3 with a schematic representation exemplary mechanism 35a. In this example, the mechanism 35a is a track system that comprises a track 60, passive rollers 62 and an actuator 64 (shown in FIG. 6D). As shown in FIG. 6A, the track 60 is secured on slot 25, while the rollers 62 is mounted onto the panel 24. FIG. 6D shows the reverse side of the panel 24 with a clearer schematic view of the rollers 62. The track 60 and the rollers 62 are arranged to be parallel with the slot 25. The actuator 64, e.g. a linear actuator, may be secured at one end 64a to the panel 24 and secured at the other end 64b to the wing 3.

The rollers 62 on the back of the panel 24 are configured to roll along the track 60 to translate the panel 24 substantially vertically (z-axis). The vertical movement of the panel 24 is driven by the actuator 64, which is attached to the panel 24. The actuator 64 is configured to move so that the panel 24 moves on the rollers 62 along the track 60.

In this example, the rollers 62 are arranged on the panel 24 while the tracks 60 are in the slot 25. However, it will be understood that the rollers 62 may be arranged in the slot 25 and the tracks 60 may be on the panel 24 instead.

Alternatively, the mechanism 35a may include actively driven rollers on a track. In this example, the mechanism 35 comprises a track 60 and rollers 62 and a motor (not shown). Preferably, the rollers 62 are mounted on the slots 25 and connected to a motor.

In this example, the panel 24 moves vertically as the motor drives the rollers 62 on the tracks 60. The panel 24 therefore can move between the first, second and third configurations 30, 40, 50.

Alternatively, a rack and pinion system may be used to displace the leading-edge device 22. The rack or racks may preferably be secured on the panel 24 and engaged with a pinion or pinions mounted in the slot and driven, e.g. by a motor to move the rack and therefore move the panel.

Figure 6C:
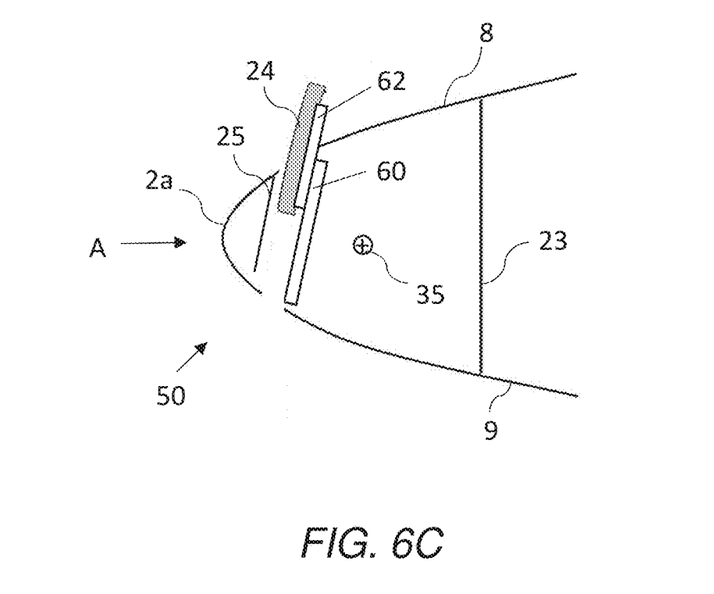
Figure 6D:
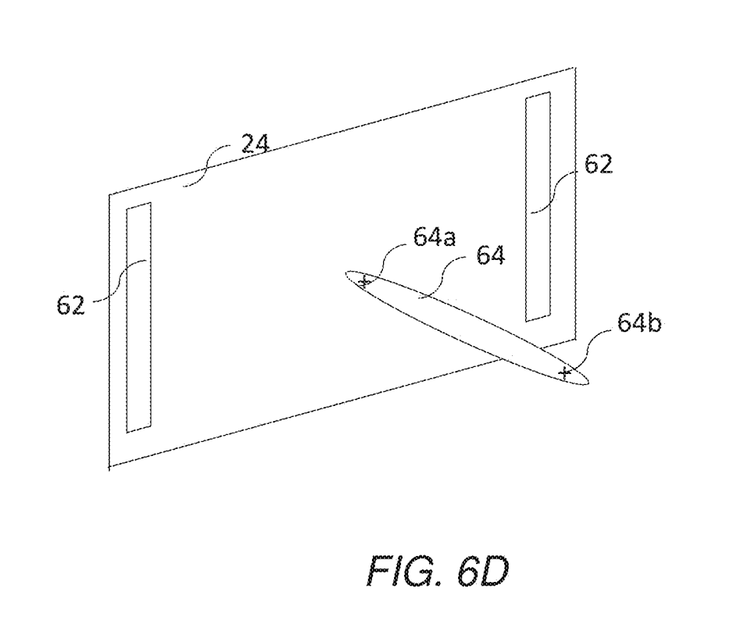
Figure 6E:
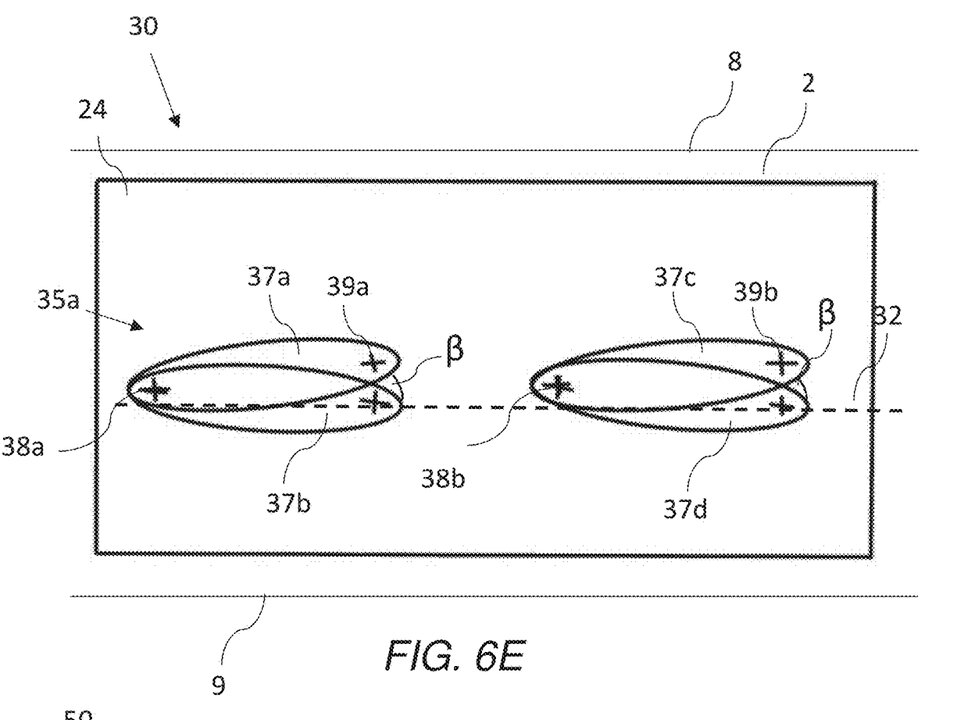
FIGS. 6E-6G shows another exemplary actuation mechanism used to move the exemplary leading edge device from a first configuration to a second and third configurations.
Figure 6F:
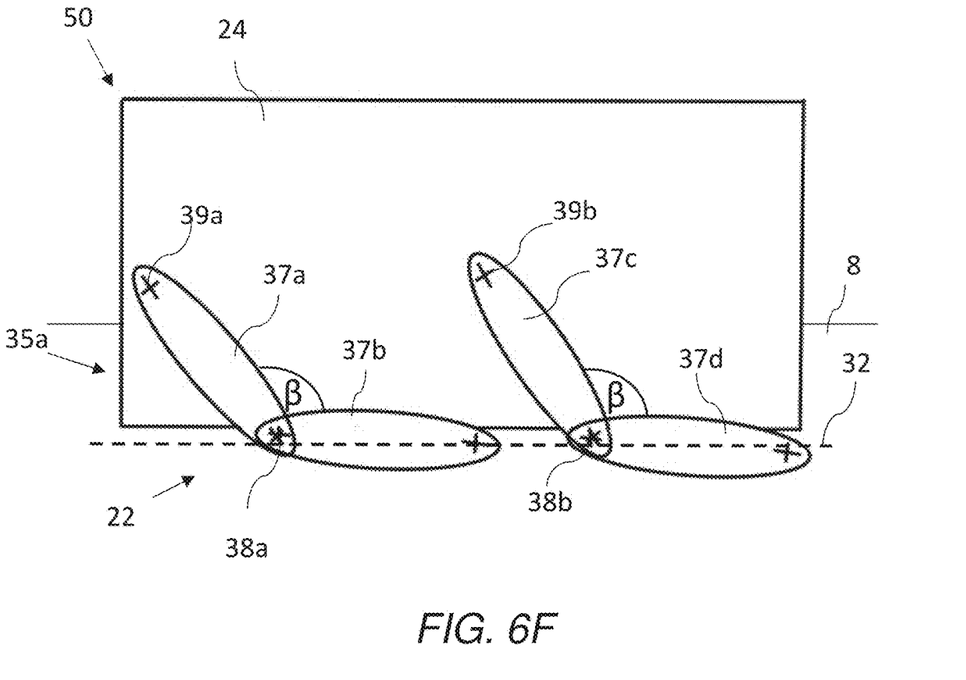
Figure 6G:
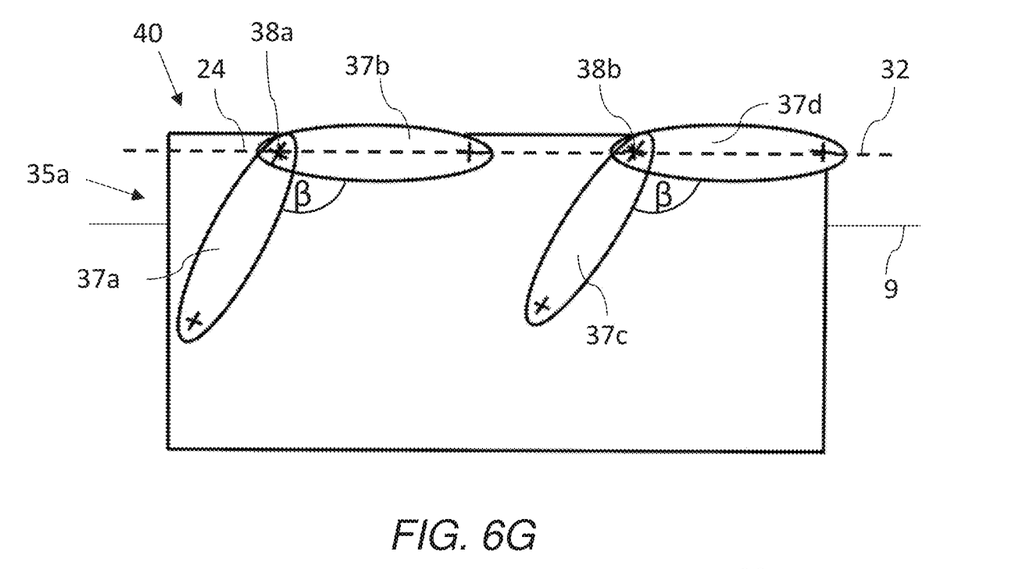

FIGS. 6B-6D shows a rear view of the wing 2 with another example of an exemplary mechanism 35a. FIG. 6B shows the panel 24 in the first configuration 30. The mechanism 35a comprises two sets of linkages, the first and second linkages, 37a, 37b, and a third and fourth linkage, 37c, 37d. As shown, the first and third linkages 37a and 37c are generally similar in orientation and length, while the second and third linkages 37b and 37d are also generally similar in length and orientation.

The second linkage 37b and the fourth linkage 37d are arranged along centre line 32 and are generally parallel with each other. As shown in FIGS. 6C and 6D, the position and orientation of the second linkage 37b and the fourth linkage 37d does not change (as indicated by the centre line 32).

The first and second linkages 37a, 37b are connected at the connection 38a, while the third and fourth linkages 37c, 37d are connected at connection 38b. The panel 24 is connected to the first linkage 37a at the connection point 39a. Similarly, the panel 24 is connected to the third linkage 37c at the connection point 37c. This may be by any suitable method such as mechanical bolting or adhesive.

As shown, in the first configuration 30, the first linkage 37a is positioned at an angle β relative to the second linkage 37b. Likewise, the third linkage 37c is positioned at an angle β relative to the fourth linkage 37d. The linkages 37a-d are configured to rotate vertically up towards the upper surface 8 of the wing to move the panel 24 into the third configuration 50, or down towards the lower surface 9 of the wing to move the panel into the second configuration 40, as shown in FIGS. 6C and 6D.

The second linkage 37b and the fourth linkage 37d are secured to the wing (not shown) so that the first linkage 37a and the third linkage 37c are may freely rotate around the connection points 38a and 38b.

FIG. 6B shows the panel 24 in the third configuration 50. In this configuration, the linkages 37a-d rotate upwards towards the upper surface 8 so that the panel 24 extends past the upper surface 8. As shown, in the third configuration 50, the angle β between the first linkage 37a and the second linkage 37b is larger relative to the angle β in the first configuration 30. Similarly, the angle β between the third linkage 37c and the fourth linkage 37d is larger relative to the angle in the first configuration β.

Because the panel 24 is attached at the connection points 39a, 39b, as the linkages 37a-d rotate, the panel translates vertically as the first and third linkages 37a, 37c rotate around the connection points 38a, 38b. The panel 24 is returned to the first configuration by opposite movement of the linkages.

FIG. 6D shows the panel 24 in the second configuration 40. In this configuration, the linkages 37a-d rotate downwards towards the lower surface 9 so that the panel 24 extends past the lower surface 9. As shown, in the second configuration 40, the angle β between the first linkage 37a and the second linkage 37b is larger relative to the angle β in the first configuration 30. Similarly, the angle β between the third linkage 37c and the fourth linkage 37d is larger relative to the angle in the first configuration β. The panel 24 is returned to the first configuration by opposite movement of the linkages.

As the linkages 37a-d rotate in order to translate the panel 24 vertically, the panel will also experience a degree of spanwise translation (not shown). The spanwise translation will depend on the length, orientation and position of the linkages 37a-d. The slot 25 may therefore be adapted in shape and size to accommodate any translation of the panel 24.

The linkages 37a-d are actuated by the actuation mechanism 35 (not shown). It will be understood while four exemplary linkages are shown in reference to FIGS. 6B-6D, any number of suitable linkages and orientations may be used. For example, a simple two arm linkage may be used, or a complex four arm linkage may be used. The length, positioning and orientation of the linkages may be adapted to fit into the wing 2. Similarly, any length and size of linkages 37a-d may be used, as well as the relative angle 3 between the linkages 37a-d.

As the wings 2,3 are similar in construction, the wing 3 will have similarly arranged leading edge device 22 for symmetry with the wing 2. While only one exemplary leading edge device 22 is described in relation to FIGS. 4A-4C, it will be understood that there may be multiple leading edge devices 22 arranged toward the leading edge 2a of the wing 2. Each leading-edge device 22 may be actuated independently by their respective actuation systems 35 or may be actuated into the second 40 or third configuration 50 in unison. Alternatively, each leading-edge device 22 may be actuated independently.

Figure 7:
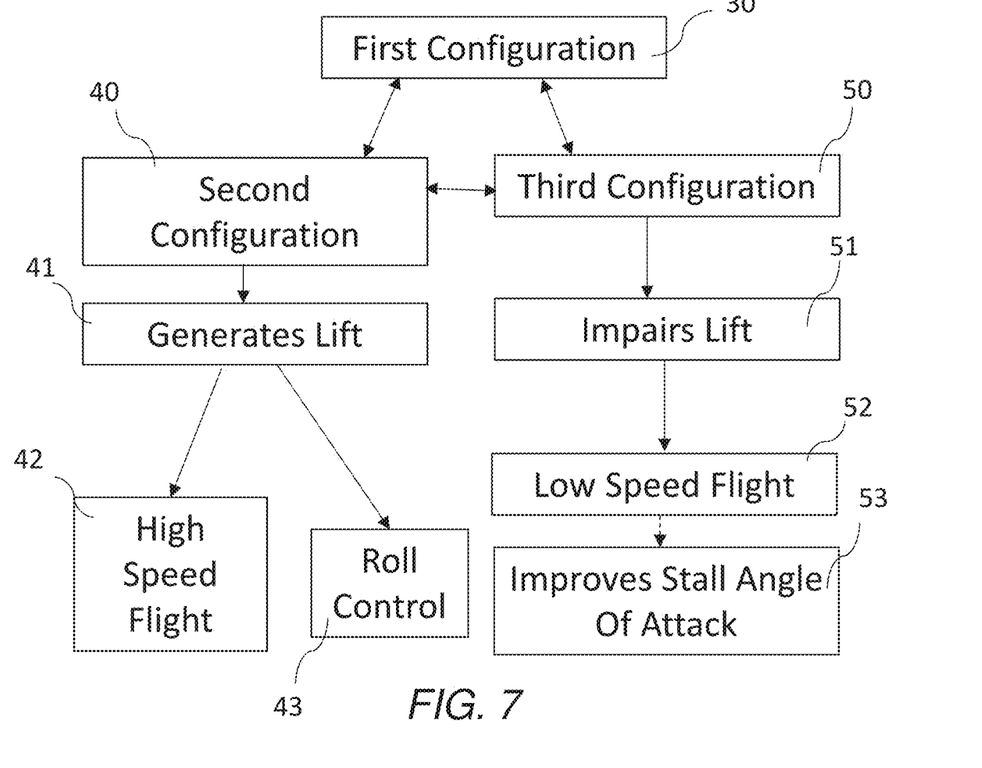
FIG. 7 shows a flow chart of the moveable leading edge device configurations.

FIG. 7 shows how the leading edge device 22 may be used during flight of the aircraft 1. As shown, the leading edge device 22 may be configured to transition from the first configuration 30 to the second configuration 40 or the third configuration 50. The movement of the leading edge device 22 is controlled by the actuator 35, which may be controlled by any suitable control system within the aircraft.

The third configuration 50 may be adopted to impair the lift 51 during low speed flight 52 to improve the stall angle of attack 53. If the leading edge device 22 is configured to move to the second configuration 40, then this may be used to generate lift 41 of the wings 2,3 during high speed flight 42 or during roll control 43. However, these are only illustrative examples of use of the second configuration 40 and the third configuration 50—these configurations may be used at any time during flight as required to control and move the aircraft 1.

As the leading edge device 22 is moveable between both the second configuration 40 and the third configuration 50, it enables the leading edge device 22 to provide both lift generation and lift dumping abilities. The leading edge device 22 can therefore be used instead of using two dedicated flight control surfaces within the wings, such as slats and spoilers/lift dumpers. The leading edge device 22 can therefore be used in areas of the wing that are smaller, as fewer actuation mechanisms are required when compared to an arrangement with two dedicated flight control surfaces.

Furthermore, this arrangement reduces the overall weight of the aircraft and complexity of the aircraft design.

As only one device is required for both lift dumping and generating, this arrangement can also be used in thin aerofoil sections, such as wing tip devices 7, where space constraints may prohibit the use of traditional actuator components.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aircraft wing comprising:
a leading edge,
a trailing edge,
an upper surface extending between the leading edge and the trailing edge,
a lower surface extending between the leading edge and the trailing,
wherein the leading edge, trailing edge, upper surface and lower surface define a wing profile, and
a moveable and unitary leading edge device mounted towards the leading edge, wherein the leading edge device is movable between:
a first configuration in which the leading edge device is retracted fully within the wing profile;
a second configuration in which at least a lower portion of a surface of the leading edge device is extended through a first aperture in the lower surface and away from the wing profile and into oncoming airflow moving over the lower surface as the aircraft wing moves through the oncoming airflow;
a third configuration in which at least an upper portion of the surface of the leading edge device is extended through a second aperture in the upper surface and away from the wing profile and into the oncoming airflow moving over the upper surface of the wing as the aircraft wing moves through the oncoming airflow.

2. The aircraft wing according to claim 1, wherein the leading edge device is driven to move between the first configuration, the second configuration and the third configuration mounted on a track or from a linkage arrangement.

3. The aircraft wing according to claim 1, wherein in the second configuration the leading edge device increases lift produced by the wing compared to the first configuration.

4. The aircraft wing according to claim 1, wherein in the third configuration the leading edge device impairs lift produced by the wing compared to the first configuration.

5. The aircraft wing according to claim 1, wherein the aircraft wing has a chord direction and the surface of the leading edge device is oriented perpendicular to the chord direction when in the second and third configurations.

6. The aircraft wing according to claim 5, wherein the surface of the leading edge device is oriented perpendicular to the chord when in the first configuration.

7. The aircraft wing according to claim 1, further comprising an actuator coupled to the leading edge device and configured to move the leading edge device between the first, second and third configurations.

8. The aircraft wing according to claim 1, wherein the leading edge device comprises a panel and a surface of the panel is the surface of the leading edge.

9. The aircraft wing according to claim 1, further comprising a front spar and wherein the leading edge device is located between the leading edge and the front spar along a chord wise direction of the aircraft wing.

10. The aircraft wing according to claim 1, wherein the aircraft wing has a root end and a tip end, and wherein the leading edge device is located closer to the tip end than to the root end.

11. The aircraft wing according to claim 1, further comprising a wing tip device and the leading edge device is located on the wing tip device.

12. The aircraft wing according to claim 1, further comprising a root end and tip end and a span between the root end and the tip end thereof, and
wherein the aircraft wing is devoid of moveable flight control surfaces overlapping in a spanwise direction the leading edge device.

13. A method of operating an aircraft wing, the wing comprising a leading edge, a trailing edge, an upper surface extending between the leading edge and the trailing edge and a lower surface extending between the leading edge and the trailing edge to define a wing profile, and a moveable and unitary leading edge device mounted towards the leading edge,
the method comprising moving the leading edge device between:
a first configuration in which the leading edge device is retracted fully within the wing profile;
a second configuration in which at least a lower portion of a surface of the leading edge device is extended through a first aperture in the lower surface, away from the wing profile and into oncoming airflow on the lower surface of the wing impairing lift produced by the wing; and
a third configuration in which at least an upper portion of the surface of the leading edge device is extended through a second aperture in the upper surface, away from the wing profile and into oncoming airflow over the upper surface of the wing increasing lift produced by the wing.

14. The method according to claim 13, wherein the second configuration is deployed during flight of the aircraft wing to alleviate wing loading or for roll control of the aircraft wing.

15. The method according to claim 13, wherein the third configuration is deployed during flight of the aircraft wing to improve a stall angle of attack of the wing.

16. A method to move a unitary leading edge device of a wing, wherein the wing includes a leading edge, a trailing edge, an upper surface extending between the leading edge and the trailing edge and a lower surface extending between the leading edge and the trailing edge, and a wing profile defined by the leading edge, the trailing edge, the upper surface and the lower surface,
the method comprising:
retracting the unitary leading edge device entirely within the wing profile of the wing;
extending at least a lower portion of the unitary leading edge device from within the wing profile, through a first aperture in the lower surface of the wing and into an oncoming airflow moving over the lower surface resulting in an impairment of lift produced by the wing; and
extending an upper portion of the unitary leading edge device from within the wing profile, through a second aperture in the upper surface of the wing and into the oncoming airflow moving over the upper surface resulting in increase lift produced by the wing.

17. The method according to claim 16, wherein the extending at least the lower portion of the unitary leading edge device is performed during flight of the wing to alleviate wing loading.

18. The method according to claim 16, wherein the extending at least the upper portion of the unitary leading edge device is performed during flight of the wing to increase a stall angle of attack of the wing.

* * * * *